United States Patent [19]

Kershaw

[11] Patent Number: 4,874,833

[45] Date of Patent: Oct. 17, 1989

[54] COMPOSITION CONTAINING EPOXY RESIN AND ALKYL HINDERED POLYAROMATIC DIAMINE AND MONOAROMATIC AMINE CURING AGENTS

[75] Inventor: Jacqueline A. Kershaw, Houston, Tex.

[73] Assignee: Shell Oil Company, Houston, Tex.

[21] Appl. No.: 234,712

[22] Filed: Aug. 22, 1988

[51] Int. Cl.[4] .............................................. C08L 63/10

[52] U.S. Cl. ...................................... 528/90; 528/120; 528/124; 525/529; 525/530

[58] Field of Search ......................... 528/90, 120, 124; 525/529, 530

[56] References Cited

U.S. PATENT DOCUMENTS

| | | | |
|---|---|---|---|
| 3,427,282 | 2/1969 | Sundholm | 528/124 |
| 3,481,900 | 12/1969 | Sundholm | 528/124 |
| 4,366,108 | 12/1982 | Urech et al. | 528/124 |
| 4,447,586 | 5/1984 | Shimp | 525/504 |
| 4,579,885 | 4/1986 | Domeier et al. | 528/124 |
| 4,579,931 | 4/1986 | Corley | 528/124 |
| 4,659,779 | 4/1987 | Bagga et al. | 525/118 |
| 4,661,559 | 4/1987 | Gardner et al. | 525/65 |
| 4,666,954 | 5/1987 | Forgo et al. | 522/83 |
| 4,775,736 | 10/1988 | Wiggins | 528/120 |

FOREIGN PATENT DOCUMENTS

| | | | |
|---|---|---|---|
| 48-85700 | 11/1973 | Japan | 528/124 |
| 63-81121 | 4/1988 | Japan | 528/124 |

*Primary Examiner*—John C. Bleutge
*Assistant Examiner*—Robert E. L. Sellers, II

[57] ABSTRACT

A curable epoxy resin composition comprising
(a) a low viscosity liquid epoxy resin;
(b) an alkyl hindered aromatic primary diamine curing agent having at least two aromatic rings;
(c) a trialkylsulfonium salt amine cure accelerator; and
(d) a liquid monoaromatic primary amine curing agent;
(e) at least one reactive monomer; and
(f) a peroxide polymerization initiator.

20 Claims, No Drawings

COMPOSITION CONTAINING EPOXY RESIN AND ALKYL HINDERED POLYAROMATIC DIAMINE AND MONOAROMATIC AMINE CURING AGENTS

FIELD OF THE INVENTION

The present invention relates to new curable epoxy resin compositions.

BACKGROUND OF THE INVENTION

There is a need for prepreggable epoxy resin compositions for use in continuous composite fabrication processes. While a large number of epoxy resin formulations are known in the art, such formulations do not have a desirable combination of both pre- and post-pultrusion properties, which would allow the resin to exit a pultrusion die in a "postformable" condition having the ability to flow sufficiently to form a slightly different shape, e.g., including with a slight twist or taper, when placed in a heated mold and then form a thermoplastic solid when quenched at room temperature. Thus, although numerous curing agents and other epoxy resin additives are known, the properties of an individual additive material convey various advantageous and disadvantageous properties to an epoxy resin formulation and even combinations of such additive materials have not filled the needs for an epoxy resin formulation suitable for the continuous composite fabrication processes discussed above.

SUMMARY OF THE INVENTION

The present invention is directed to a curable epoxy resin composition comprising:

(a) a low viscosity liquid epoxy resin;

(b) a alkyl hindered aromatic primary diamine curing agent having at least two aromatic rings;

(c) a trialkylsulfonium salt amine cure accelerator;

(d) a liquid monoaromatic primary amine curing agent;

(e) at least one reactive monomer; and (f) a peroxide polymerization initiator.

The composition of the invention provides a curable epoxy resin system for pultrusion of a B-stage composite such that the composite would exit the pultrusion die in a postformable condition having the ability of flowing to form a slightly different shape, such as a slight taper or twist, when placed in a heated mold. The composite is capable of being postformed for an extended period after initial pultrusion.

The compositions of the invention preferably have the following properties:

1. a low impregnation viscosity at a moderate temperature (e.g., <3000 cP at ≦40° C.);

2. a working life at impregnation temperature of at least 4 hours;

3. the ability to form a non-tacky "prepreg" (i.e., partially cured resin impregnated composite) at room temperature after short-term application of heat (e.g., <900 seconds at 180° C.);

4. prepreg stability (i.e., still thermoplastic) of at least 2 weeks under reasonable storage conditions (e.g., storage at 5° C.+);

5. one hundred percent reactive (i.e., no solvents);

6. a cured HDT at 264 psi >150° C.

Any conventional epoxy resin which is a liquid and which has a relatively low viscosity can be used as component (a) of the composition. By relatively low viscosity is meant a viscosity of from about 100 centistokes to about 5000 centistokes and, preferably from about 100 centistokes to about 1000 centistokes.

The liquid epoxy resin component of the invention composition can be any curable liquid epoxy resin having, on the average, more than one vicinal epoxide group per molecule. The liquid epoxy resin can be saturated or unsaturated, aliphatic, cycloaliphatic, aromatic or heterocyclic, and may bear substituents which do not materially interfere with the curing reaction. They may be monomeric or polymeric.

Suitable liquid epoxy resins include glycidyl ethers prepared by the reaction of epichlorohydrin with a compound containing at least one hydroxyl group carried out under alkaline reaction conditions. The liquid epoxy resin products obtained when the hydroxyl group-containing compound is bisphenol-A are represented below

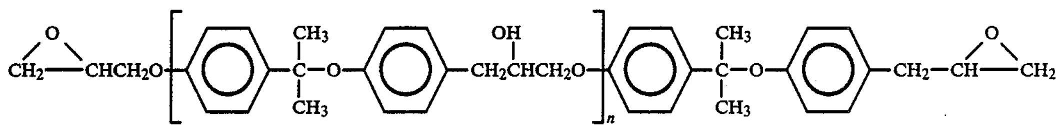

wherein n is zero or a number greater than 0, commonly in the range of 0 to 10, preferably in the range of 0 to 2. Other suitable liquid epoxy resins can be prepared by the reaction of epichlorohydrin with a polyhydric phenol, including mononuclear di- and trihydroxy phenolic compounds such as resorcinol and phloroglucinol, selected polynuclear polyhydroxy phenolic compounds such as bis(p-hydroxyphenyl)methane and 4,4'-dihydroxybiphenyl, or aliphatic polyols such as 1,4-butanediol and glycerol. Suitable liquid epoxy resins are also disclosed in U.S. Pat. Nos. 2,633,458 and 4,366,108, the disclosures of which are incorporated herein by references.

Liquid epoxy resins suitable for the invention compositions have molecular weights generally within the range of 100 to about 10,000, preferably about 200 to about 1500. The commercially available liquid epoxy resin EPON® Resin 828, a reaction product of epichlorohydrin and 2,2-bis(4-hydroxyphenyl)propane (bisphenol-A also known as BPA) having a molecular weight of about 400, an epoxide equivalent (ASTM D-1652) of about 185–192, and an n value in the formula above of about 0.2 or EPON® Resin 825, an essentially pure diepoxide of BPA having a slightly lower molecular weight than EPON® 828, are presently the preferred liquid epoxy resin because of their low viscosity and commercial availability. The liquid epoxy resin will generally be present in the composition in an amount of from about 60 to about 99 weight percent, preferably about 65 to about 80 weight percent, based on the weight of the total composition.

The alkyl hindered aromatic primary diamines useful in this invention are sterically hindered aromatic diamines containing two primary amine groups and at least two aromatic rings. The alkyl hindered primary aromatic diamine curing agents are liquid or low melting solids and are much easier to incorporate into an epoxide resin than conventional aromatic polyamines. The two primary amine groups are attached directly to either non-adjacent carbon atoms in the same end group aromatic nucleus or to two different end group aromatic nuclei. At least one position ortho to each amine group contains an alkyl substituent having one to three carbon atoms. Preferred hindered amines are those wherein no more than one position ortho to each amine group contains a hydrogen or methyl substituent. Particularly preferred alkyl hindered amines are those wherein at least 3 of the positions ortho to the amine groups contain an alkyl substituents. These alkyl hindered aromatic diamines can be mononuclear or dinuclear, trinuclear or higher in which one primary amine group is attached to each end group aromatic nucleus. Examples of such alkyl hindered aromatic diamines are methylenebis (2,6-diisopropyl-aniline), methylenebis(2,6-diethylaniline), methylenebis(2-methyl-6-ethylaniline) and the like. The preferred alkyl hindered aromatic diamine is EPON® HPT$^{\beta}$ Curing Agent 1062, alpha, alpha'-bis(3,5-dimethyl-4-aminophenyl)-p-diisopropyllbenzene.

Any liquid monoaromatic primary amine can be used as a curing agent (d) and the like. Preferably, the liquid aromatic amine is a diamine such as methylenedianiline 2,4-bis(p-aminobenzyl)aniline, or is a second but liquid hindered aromatic amine, such as diethyltoluenediamine (a mixture of 1-methyl-3,5-diethyl-2,4-diaminobenzene and 1-methyl-3,5-diethyl-2,6-diaminobenzene), alone or with about 20% of a reactive monomer described later, such as an acrylate or methacrylate ester of a polyol, trimethylolpropane trimethacrylate.

The total amount of amine curing agents (b) plus (d) is sufficient to cure the composition considering the other kinds and types of ingredients present and can readily be determined by those of skill in the art. For example, the amount can be from about 0.5 to about 2.0 chemical equivalents of amine to epoxy resin (one amino hydrogen per epoxy group). The aromatic diamine (b) is suitably present in an amount of from about 5 to about 35% by weight of the total composition. The liquid amine (d) is suitably present in an amount of from about 2 to about 25% by weight of the total composition. The ratio by weight of (b) to (d) varying from about 10:1 to about 1:3.

Any conventional amine curing accelerator can be used and is present in an amount effective to increase the rate of cure of the epoxy resins. Use of the accelerator allows the composition to be relatively low in viscosity prior to application of heat. Upon short-term heating the accelerator promotes sufficient cross-linking such that, as the mass is cooled to room temperature, it ill form a non-tacky solid. The curing agent is relatively latent, and will build in prepreggability by increasing the inherent viscosity of the total resin system.

Particularly suitable amine cure accelerators include the triakylsulfonium salts containing anions of low nucleophilicity are preferred. Suitable tri(-hydrocarbyl)-sulfonium salts have the following general formula:

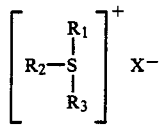

wherein $R_1$, and $R_2$, and $R_3$ each represent the same or different alkyl or aryl radicals of from 1 to about 18 carbon atoms; and X is selected from the group: $BF_4$, $PF_6$, $AsF_6$, $SbF_6$, $CF_3SO_3$, 2,4,6-trinitrobenzenesulfonate, p-toluenesulfonate, etc. The alkyl or aryl radicals $R_1$, $R_2$ and $R_3$ may contain various substituents such as oxygen, sulfur, halogens, etc.

Suitable triorgano-sulfonium salts include, among others, triethylsulfonium tetrafluoroborate, methyldiphenylsulfonium tetrafluoroborate, ethyldipheylsulfonium tetrafluoroborate, allyldimethylsulfonium tetrafluoroborate, allyl bis(2-(allyloxy)ethyl)sulfonium tetrafluoroborate, trimethylsulfonium hexafluorophosphate, ethyl(2-hydroxyethyl)(2-ethylthio)ethyl)sulfonium tetraflouroborate, 2-ethylthio)ethylsulfonium tetraflouroborate.

Briefly, these triorgano-sulfonium salts can be prepared by a number of processes. One process involves reaction of a sulfonium halide with the silver salt of a nonnucleophilic anion such as tetrafluoroborate. In a second process, an alcohol such as allyl alcohol, a sulfide such as dimethyl sulfide, and an acid such as tetrofluoroboric acid containing an anion of low nucleophilicity, are mixed and refluxed. In some cases a thiol may be used instead of a sulfide. Water is removed by azeotropic distillation and entrained in a Dean-Stark trap and the sulfonium salt is left in the pot (in this case, allyldimethylsulfonium tetrafluoroborate). In a third process, a $\beta$-hydroxyalkyl sulfide, such as 2,2'-thiodiethanol, is mixed with an acid containing an ion of low nucleophilicity and water is removed by vacuum distillation, leaving a sulfonium salt mixture.

In general, a catalytic amount of triorgano-sulfonium salts are used, i.e., 0.001% to about 10% by weight of the epoxy resin, preferably about 0.3% to about 5% by weight of the epoxy resin.

The amount of amine cure accelerator which is present can vary but will generally be within the range of about 0.50 to about 2.0 equivalents of amine to epoxy resin, preferably from about 0.75 to about 1.25 equivalent of amine for each equivalent of epoxy resin, although this can vary depending of the curing agent and the condition of the cure.

The invention composition further contains at least one reactive monomer (e). Any conventional reactive monomer can be used including vinyl aromatic monomers, esters of ethylenically unsaturated carboxylic acids, amides of ethylenically unsaturated carboxylic acids, polyacrylate esters of polyols, polymethacrylate esters of polyols, cyano-containing compounds, vinyl esters, vinyl amides and allyl-containing compounds, and preferably, a low molecular weight ethylenically unsaturated momomer having a molecular weight of less than about 325. The reactive monomer is generally an aliphatic or aromatic monomer having at least one site of vinyl unsaturation. Examples of unsaturated aromatic monomers include, for example, styrene, $\alpha$-methyl styrene, p-methyl styrene, halo- and nitrosubstituted styrenes, such as vinyl toluene, chlorostyrene, bromostyrene, nitrostyrene, divinylbenzene, tertbutylstyrene, 2-vinylpyridine, and vinylnaphthalene. Styrene is the preferred vinyl aromatic monomer.

The reactive monomer can be an ester or amide of an ethylenically unsaturated carboxylic acid such as acrylic acid, methacrylic acid, crotonic acid, α-phenylacrylic acid, α-cyclohexylacrylic acid, maleic acid, cyanoacrylic acid and methoxyacrylic acid. Examples of esters of these include methyl methacrylate, ethyl acrylate, butyl acrylate, butyl methacrylate, isobutyl methacrylate, 2,3-dibromopropyl acrylate and pentachlorophenyl methacrylate.

Also included in the reactive monomers are polyacrylate and polymethacrylate esters of polyols containing more than one terminal acrylate or methacrylate group, such as acrylates and methacrylates of alkylene glycols, polyoxyalkylene glycols, alicyclic glycols, and higher glycols, such as, for example, ethylene glycol, triethylene glycol, tetraethylene glycol, tetramethylene glycol, hexanediol, trimethylolethane, trimethylolpropane and pentaerythritol. Typically such unsaturated monomers include trimethylolpropane triacrylate, trimethylolethane triacrylate, trimethylolpropane trimethacrylate, trimethylolethane trimethacrylate, tetramethylene glycol dimethacrylate, ethylene glycol dimethacrylate, triethylene glycol dimethacrylate and 1,6-hexanediol diacrylate. Preferred esters are neopentyl glycol dimethacrylate, trimethylolpropane trimethacrylate, trimethylolpropane triacrylate, pentaerythritol triacrylate and 1,3-butylene dimethacrylate.

Examples of unsaturated carboxylic acid amides include acrylamide, N,N'-dimethylacrylamide, diacetone acrylamide, N-isopropylacrylamide and N,N'-dimethyl methacrylamide.

The reactive monomer can be a cyano-containing compound such as acrylonitrile, methacrylonitrile and halogenated acrylonitriles.

The reactive monomer can be a vinyl ester or amide such as vinyl acetate, vinyl benzoate, divinyl adipate, N-vinylpyrrolidone, N-vinylacetamide and N,N-divinyladipamide.

The reactive monomer can be an allyl-containing monomer such as diallyl phthalate, triallyl isocyanurate, diallyl isphthalate and allyl diglycol carbonate.

The reactive monomer can also be a mixture of one or more of the above monomers. A mixture of a vinyl aromatic monomer, such as styrene, and a multifunctional methacrylate, such as trimethylolpropane trimethacrylate (TMPTMA), is preferred. In some cases, the additional reactive monomer(s) are added as an admixture with the amine (b) or (d).

The total reactive monomer will generally be present in the composition in an amount effective to reduce the viscosity of the composition to the desired level. Generally, the reactive monomer diluent will be present in an amount of about 0.5 to about 15 weight percent, preferably about 0.5 to about 10 weight percent, based on the weight of the total composition.

The peroxide free radical polymerization initiator (f) is present in an amount effective to crosslink the reactive monomer. Examples of such initiators include benzoyl peroxide, tert-butyl hydroperoxide, ditert-butyl peroxide, hydrogen peroxide, potassium persulfate, methyl cyclohexyl peroxide, cumene hydroperoxide, acetyl benzoyl peroxide, dicumyl peroxide, 2,5-bis(tert-butylperoxy)-2,5-dimethylhexane and the like. The peroxide is preferably an aliphatic peroxide and especially 2,5-bis(tert-butylperoxy)-2,5-dimethylhexane. The amount of the peroxide free radical initiator can vary over a wide range depending upon the type and amount of vinyl monomer present and the type of initiator and desired end properties. In general terms, the amount of the peroxide free radical initiator will, for most purposes, fall within the range of about 0.0001 to about 10 weight percent, preferably about 0.0001 to about 5 weight percent, based on the weight of the total composition.

The monomers will usually contain an amount of a polymerization inhibitor effective to prevent premature polymerization of the monomer, generally less than about 0.5 weight percent, usually less than about 0.2 weight percent, based on the weight of the monomer. Examples of suitable inhibitors include tertiary butyl catechol, benzoquinone, hydroquinone, phenothiazine and the like.

The invention compositions are useful as sheet molding compositions, in structural applications such as automobile parts, coatings and electrical laminates. The composition is suitable for fiber-reinforced composites applications, for which a fibrous reinforcing material, such as chopped glass, glass fibers, carbon fiber, and the like, in the form of a mat, cloth or continuous fibers, for example, is impregnated with the epoxy resin system. The impregnated fibers are usually subjected to a relatively mild heat treatment ("B-staged") to partially cure the resin to a flexible, non-tacky state, or "prepreg." The prepreg is then subjected to elevated temperature and pressure so as to completely cure the resin to a hard, inflexible state. A plurality of prepregs can layered and cured to form a laminate having utility in circuit boards. Many such processes are known in the art for such purposes. For such electrical applications, the properties of flame retardance and high Tg are important. The composition of the invention provides a curable epoxy resin system for pultrusion of a B-stage composite such that the composite would exit the pultrusion die in a postformable condition having the ability of flowing to form a slightly different shape, such as a slight taper or twist, when placed in a heated mold such as described in copending U. S. patent application Ser. No. 213,412, filed June 30, 1988. The composite is capable of being postformed for an extended period after initial pultrusion.

ILLUSTRATIVE EMBODIMENTS

The invention is illustrated by the following embodiments, which should not be regarded as limiting it in any way.

EMBODIMENT 1

A simple test was used to determine prepregability and resulting stability. The procedure was to place aluminum foil in a frame designed to hold the foil in close contact with a heated hot plate surface. 0.5 gram of liquid epoxy resin mixture was placed on the foil/hot plate and allowed to heat for a chosen period of time. The frame, foil and resin was then removed from the hot plate and immediately quenched by placement on a cool metal plate.

The material would be considered prepreggable if it formed a non-tacky solid after quenching. Stability was measured via the following procedure: the partially reacted, quenched resin (on the foil media) the cut in half and aged at ambient and refrigerated (7° C.) temperatures. If the aged material flowed after it was placed back on the hot plate, it was determined to still be in a thermoplastic state.

The epoxy resin formulations were prepared in parts of ingredients per 100 parts of resin (weight basis) as set forth in Table 1 below. For example, a formulation 1 was prepared by mixing 100 parts of EPON Resin 825 at 125° C. with 40 part alpha, alpha'-bis(3,5-dimethyl-4-aminophenyl)-p-diisopropylbenzene and the other ingredients shown and stirring the mixture at 125° C. to give a very high viscosity blend. At temperatures below 80° C., the blend formed a semisolid.

(2) Tensile Strength: At high accelerator content, this characteristic is relatively insensitive to HPT 1062 content. The highest values are seen at high HPT 1062/low accelerator concentrations.

(3) Tensile Elongation: At low HPT 1062 content, this characteristic is relatively insensitive to accelerator content. Like the tensile strength, the highest values of elongation are seen at high HPT/low accelerator concentrations.

TABLE 1

| | Formulations Evaluated and Neat Resin Test Results for Prepreg Pultrusion Resin Systems | | | | | | | |
|---|---|---|---|---|---|---|---|---|
| Mix T[1] | 1 | 2 | 3 | 4 | 5 | 6(× 3)[2] | | |
| EPON ® 825 | 100 | 100 | 100 | 100 | 100 | 100 | | |
| EPON ® HPT 1062 130° C. | 40 | 29.6 | 12.9 | 12.9 | 29.6 | 25 | | |
| EPON ® CA 9470 <40° C. | 6.5 | 13.2 | 23.9 | 23.2 | 13.2 | 16.1 | | |
| Styrene <40° C. | 1.29 | 2.63 | 4.79 | 4.79 | 2.63 | 3.23 | | |
| RSM 537 <40° C. | 1.000 | 1.951 | 1.588 | 0.412 | 0.049 | 1.000 | | |
| Lupersol 101 <40° C. | 0.05 | 0.05 | 0.05 | 0.05 | 0.05 | 0.05 | | |
| 40° C. Viscosity, cP[3] | 5460 | 1930 | 477 | 427 | 1630 | 1230 | 1060 | 1210 |
| 40° C. Pot Life, hr | 3.8 | 3.4 | 3.5 | 6.0 | 17.3 | 3.3 | 3.9 | 4.0 |
| 25° C. Pot Life, hr[4] | — | 7.2 | 9.1 | 18.9 | 49.2 | 10.0 | 10.4 | 10.6 |
| Gel time, 180° C. sec[5] | 93/115 | 63/82 | 102/140 | 380/460 | 755/890 | 110/152 | 130/155 | 122/155 |
| 21° C. sec | 27/44 | 18/27 | 40/53 | 128/182 | 325/375 | 38/54 | 43/55 | 38/57 |

[1] Mixing temperatures. EPON 825 was heated to 125° C.; when adding HPT 1062, continued to apply heat while stirring at 120–130° C. Took 30 minutes to completely dissolve. All other components are liquid, and were added as the system cooled towards use temperature. In the case of solution number 1, CA 9470 was added at 60° C., followed by styrene, RSM 537 and Lupersol 101 at 40° C.

[2] Formulation No. 6 was performed in triplicate, with performance of the three repetitions interspersed between the first five formulations.

[3] Viscosity measured using a Brookfield cone and plate viscometer with a constant temperature bath.

[4] Pot life determined as the time to doubling of initial viscosity. 25° C. Pot life determined using Brookfield viscometer with small sample adaptor and temperature control bath.

[5] Gel times are reported as two numbers: the first is time to initial gel formation; the second is to full solidification.

EPON ® 825 = a diepoxide of BPA

EPON ® HPT 1062 = alpha, alpha'-bis(4-amino-3,5-dimethylphenyl)-p-diisopropylbenzene EPON ® CA 9470 = diethyltoluenediamine containing 20% weight trimethlolpropane trimethacrylate (TMPTMA)

RSM537 = 2-(ethylthio)ethanol condensed with $HBF_4$.

Lupersol 101 = 2,5-bis(tert-butylperoxy)-2,5-dimethylhexane

To evaluate whether the resin system could pass the temperature resistance requirement and to determine several other key physical characteristics, castings were fabricated using the formulations described in Table 1. These particular formulations were chosen by using a three-variable balanced statistical design. The two formulation variables were HPT 1062 content (relative to total HPT 1062/CA 9470 content) and accelerator RSM 537 content.

(1) HTD, Tg: These characteristics are most significantly affected by the accelerator content. The highest values are seen at high accelerator/high HPT 1062 concentrations.

(4) Compact Tension: At high HPT 1062 content, this characteristic is relatively insensitive to accelerator content.

EMBODIMENT 2

An experiment was developed to characterize the effect of two variables, the percent hindered aromatic diamine (b) HPT 1062 in a blend of HPT 1062 and CA 9470, and the percent (c) accelerator RSM 537. Table 2 contains the formulations which were evaluated.

Neat resin tests included 180° C. and 210° C. gel time, 40° C. viscosity and pot life and 25° C. pot life. The formulation in parts of ingredients per 100 parts of resin (weight basis) and the results results are listed in Table 2.

TABLE 2

| | Formulations Evaluated and Neat Resin Test Results for Prepreg Pultrusion Resin Systems | | | | | | | |
|---|---|---|---|---|---|---|---|---|
| Mix T[1] | 1 | 2 | 3 | 4 | 5 | 6(× 3[2]) | | |
| EPON ® 825 | 100 | 100 | 100 | 100 | 100 | 100 | | |
| EPON ® HPT 1062 130° C. | 40 | 29.6 | 12.9 | 12.9 | 29.6 | 25 | | |
| EPON ® CA 9470 <40° C. | 6.5 | 13.2 | 23.9 | 23.9 | 13.2 | 16.1 | | |
| Styrene <40° C. | 1.29 | 2.63 | 4.79 | 4.79 | 2.63 | 3.23 | | |
| RSM 537 <40° C. | 1.000 | 1.951 | 1.588 | 0.412 | 0.049 | 1.000 | | |
| Lupersol 101 <40° C. | 0.05 | 0.05 | 0.05 | 0.05 | 0.05 | 0.05 | | |
| Casting Properties:[3] | | | | | | | | |
| Tg[4], °C. | 219 | 217 | 215 | 209 | 185 | 214 | 213 | 215 |
| HDT[5], °C. | 183 | 174 | 176 | 174 | 153 | 177 | 177 | 178 |
| Compact Tension: | | | | | | | | |
| ksi (sqrt. in) | 518(22)[6] | 486(34) | 478(6) | 597(35) | 566(60) | 536(23) | 521(26) | 502(34) |
| Tensile Properties:[7] | | | | | | | | |
| strength, ksi | 10.4(.2) | 9.9(.4) | 10.1(.4) | 9.5(.4) | 11.5(.3) | 9.8(.8) | 9.7(.5) | 9.4(.5) |
| modulus, ksi | 401(5) | 428(14) | 434(14) | 388(6) | 395(14) | 416(21) | 410(13) | 395(5) |

TABLE 2-continued

Formulations Evaluated and Neat Resin Test Results for Prepreg Pultrusion Resin Systems

| Mix T[1] | 1 | 2 | 3 | 4 | 5 | 6(× 3[2]) | | |
|---|---|---|---|---|---|---|---|---|
| elongation, % | 4.8(.1) | 3.8(.4) | 4.4(.5) | 4.5(.3) | 5.9(.4) | 4.1(.6) | 4.2(.5) | 3.9(.5) |

[1]Mixing temperatures. EPON ® 825 was heated to 125° C.; when adding HPT 1062, continued to apply heat while stirring at 120–130° C. Took 30 minutes to completely dissolve. All other components are liquid, and were added as the system cooled towards use temperature. In the case of solution number 1, CA 9470 was added at 60° C., followed by styrene, 537 and Lupersol 101 at 40° C.
[2]Formulation No. 6 was performed in triplicate, with performance of the three repetitions interspersed between the first five formulations.
[3]Cure schedule for castings: 2 hours at 150° C.; four hours at 200° C.
[4]Glass transition temperature measured at peak of tan delta from Rheometrics Dynamic Mechanical Spectrometry viscometer with seal sample adaptor and temperature control bath.
[5]ASTM 648-72; load = 264 psi.
[6]Standard deviation.
[7]ASTM D-638.

(1) The gel time was most affected by quantity of accelerator RSM 537. The effect of HPT 1062 content was probably not significant.

(2) The 40 C viscosity was most effected by quantity of HPT 1062. Here the effect of RSM 537 was probably not significant.

(3) The 40° C. and 25° C. pot lives were most affected by quantity of accelerator RSM 537. There appeared, however, to be a lesser, but still significant, increase in pot life as the HPT 1062 concentration increased.

EMBODIMENT 3

Resin formulations (differing in Accelerator RSM 537 concentration) were prepared. Table 3 contains the results of a prepreg stability study of heating and aging times with these formulations. The base resin system contained EPON Resin 825 (100)/EPON CURING AGENT HPT 1062 (28)/EPON CURING AGENT 9470 (14.2)/styrene (2.9)/Lupersol 101 (0.05).

TABLE 3

Resin Systems Used for Prepreg Formation/Stability Study

| Resin Formulation: | 1 | 2 | 3 | 4 |
|---|---|---|---|---|
| EPON CURING AGENT ACCELERATOR 537 | 0.05 | 0.10 | 0.20 | 0.30 |
| Time on 180° C. Gel Plate, seconds | — | — | — | 200 |
| | — | — | — | 300 |
| | — | — | 400 | 400 |
| | — | 500 | 500 | 500 |
| | 600 | 600 | 600 | — |
| | 700 | 700 | 700 | — |
| | 800 | 800 | 800 | — |
| | 900 | 900 | — | — |

The main variable which had an effect on the prepreg stability of the aged panels was thickness of the resin film. In spots where the resin film was relatively thick, the material had a greater tendency to form gelled areas on the foil surface. However, thin resin areas tended to stay totally thermoplastic for longer periods of time. This difference is likely due to the differences in the thermal environment in a thick and thin film of resin. During the initial heating stage, the air circulation above the hot plate would keep the thin film cooler (per unit mass), slowing the cure reaction. In a thick film, however (assuming a similar surface area), there would be less heat loss (per unit mass) due to air circulation and the temperature would be closer to the gel plate temperature (there is even a possibility of some exotherm).

To reduce the heterogeneous observations caused by film thickness variation, the aged films were checked every few days and a seven-part rating was used. The rating system was as follows: F=flow when placed on 180° C. hot plate; P=partial gelation, ranging from slight indication of gel (P--) to mostly gelled (P++); G=complete gelation.

The decision on gelation was determined by: (1) rechecking the results with a similarly aged sample, and (2) analyzing the previous results to determine if the overall trend was towards gelation.

The result was that the resin system was prepreggable at all concentrations of Accelerator RSM 537. After two weeks of aging, the prepreg test indicated that the resin system was stable at all concentrations of Accelerator RSM 537. Only at long exposure times and high accelerator concentration did the material indicate a trend towards gelation.

EMBODIMENT 4

A resin system in parts per 100 parts of resin (phr) which was chosen for evaluation was as follows:

| | phr |
|---|---|
| EPON Resin 825 | 100 |
| EPON CURING AGENT HPT 1062 | 8 |
| EPON CURING AGENT 9770 | 11.4 |
| EPON CA Accelerator RSM 537 | 0.05–0.3 |
| Styrene | 2.84 |
| Lupersol 101 | 0.10 |

A pair of castings was prepared with the above formulation at 0.05 and 0.20 phr of RSM 537. The property results are shown in Table 4. The properties of the low RSM 537 formulation in Table 4 illustrates a low temperature resistance (HDT and Tg) which corresponds to low RSM 537 concentration.

TABLE 4

Performance of Postformable Pultrusion Formulations

| | 1 | 2 |
|---|---|---|
| 537 phr | 0.20 | 0.05 |
| Viscosity: | | |
| 25° C., cP | 10650 | NA |
| 40° C., cP | 1275 | |
| Pot Life: | | |
| 25° C., cP | 25.8 hr | NA |
| 40° C., cP | 7.9 hr | |
| Gel Time, sec: | | |
| 180° C. | 465/570 | 793/915 |
| 210° C. | 202/242 | 325/366 |
| Tg, °C. | 211 | 185 |
| HDT, °C. | 180,180 | 154,153 |
| Compact Tension: ksi (sqrt.in) | 573(8.3)[1] | 540(34.9) |
| Tensile, 25° C.: | | |
| strength, ksi | 10307(190) | 11361(261) |
| elongation, % | 5.57(0.21) | 5.52(0.47) |

TABLE 4-continued

| Performance of Postformable Pultrusion Formulations | | |
|---|---|---|
| | 1 | 2 |
| modulus, ksi | 360(9.2) | 406(31.6) |

[1]Standard deviation

What is claimed is:

1. A curable epoxy resin composition comprising
(a) a low viscosity liquid epoxy resin;
(b) an alkyl hindered aromatic primary diamine curing agent having at least two aromatic rings.
(c) an amine cure accelerator;
(d) a liquid monoaromatic primary amine curing agent;
(e) at least one reactive ethylenically unsaturated monomer; and
(f) a peroxide polymerization initiator.

2. A composition according to claim 1 wherein the low viscosity liquid epoxy resin is a glycidyl ether prepared by reacting epichlorohydrin with a compound containing at least one hydroxyl group under alkaline conditions.

3. A composition according to claim 2 wherein the epoxy resin is a glycidyl ether prepared by reacting epichlorohydrin with a polyhydric phenol.

4. A composition according to claim 3 wherein the epoxy resin is a glycidyl ether prepared by reaction of epichlorohyudrin with bisphenol A.

5. A composition according to claim 1 wherein the alkyl hindered aromatic primary diamine (b) is one containing at least two aromatic rings, two primary amine groups directly attached to either nonadjacent carbon atoms in the same end group aromatic nucleus or to two different end group aromatic nuclei and each position ortho to each amine group contains an alkyl substituent having one to three carbon atoms.

6. A composition according to claim 5 wherein the diamine is alpha, alpha'-bis(3,5-dimethyl-4-aminophenyl)-p-diisopropylbenzene.

7. A composition according to claim 1 wherein the amine cure accelerator is a sulfonium salt.

8. A composition according to claim 7 wherein the amine cure accelerator is a sulfonium salt mixture made by condensing 2-(ethylthio)ethanol, $CH_3CH_2SCH_2CH_2OH$ with $HBF_4$.

9. A composition according to claim 1 wherein the liquid monoaromatic primary amine is 2,4-toluenediamine, diethyltoluenediamine or methylenedianiline.

10. A composition according to claim 1 wherein the reactive monomer is a low molecular weight ethylenically unsaturated monomer.

11. A composition according to claim 10 wherein the reactive monomer is selected from vinyl aromatic monomers, esters of ethylenically unsaturated carboxylic acids, amides of ethylenically unsaturated carboxylic acids, polyacrylate esters of polyols, polymethacrylate esters of polyols, cyano-containing compounds, vinyl esters, vinyl amides and allyl-containing compounds.

12. A composition according to claim 11 wherein the reactive monomer is a vinyl aromatic monomer.

13. A composition according to claim 12 wherein the reactive monomer is styrene.

14. A composition according to claim 12 wherein the reactive monomer is trimethylolpropane trimethacrylate.

15. A composition according to claim 1 wherein the peroxide polymerization initiator is an aliphatic peroxide.

16. A composition according to claim 15 wherein the peroxide is 2,5-bis(tert-butylperoxy)-2,5-dimethylhexane.

17. A composition according to claim 1 wherein
(a) is a glycidyl ether prepared by reacting epichlorohydrin with a polyhydric phenol;
(b) is an alkyl hindered aromatic primary diamine containing at least two aromatic rings, two primary amine groups directly attached to either non-adjacent carbon atoms in the same end group aromatic nucleus or to two different end group aromatic nuclei and each position ortho to each amine group contains an alkyl substituent having one to three carbon atoms;
(c) is a sulfonium salt;
(d) is a monoaromatic diamine;
(e) is a vinyl aromatic monomer; and
(f) is an aliphatic peroxide.

18. A composition according to claim 17 wherein
(a) is a glycidyl ether prepared by reacting epichlorohydrin with bisphenol A;
(b) is alpha, alpha'-bis(3,5-dimethyl-4-aminophenyl)-p-diisopropylbenzene;
(c) is a sulfonium salt mixture made by condensing 2-(ethylthio)ethanol, $CH_3CH_2SCH_2CH_2OH$ with $HBF_4$;
(d) is 2,4-toluenediamine, diethyltoluenediamine or methylenediamine along or with 20% trimethylolpropane trimethacrylate;
(e) is styrene; and
(f) is 2,5-bis(t-butylperoxy)-2,5-dimethylhexane.

19. A prepreg comprising the composition of claim 1.

20. An electrical laminate comprising the composition of claim 1.

* * * * *